Oct. 27, 1959 — O. A. BROWN — 2,910,124
WELL TOOL RETRIEVING MEANS
Filed Dec. 23, 1954 — 5 Sheets-Sheet 1
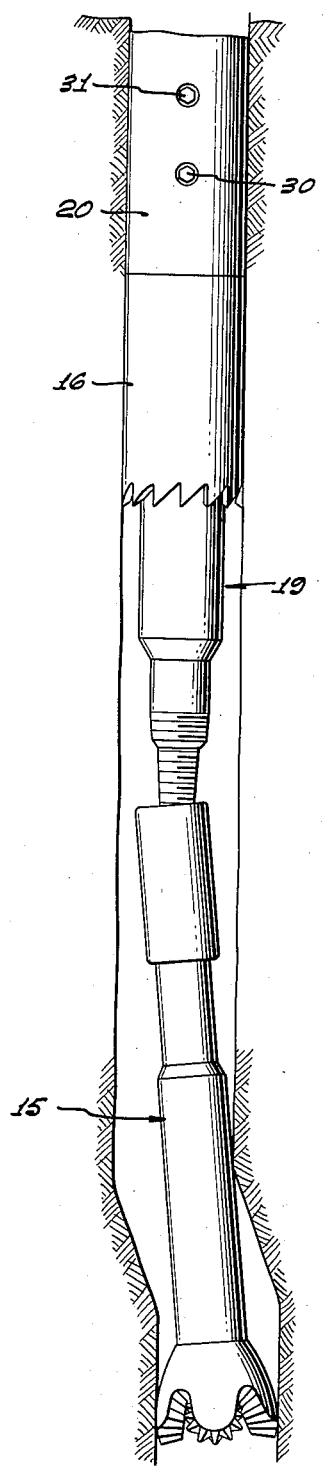
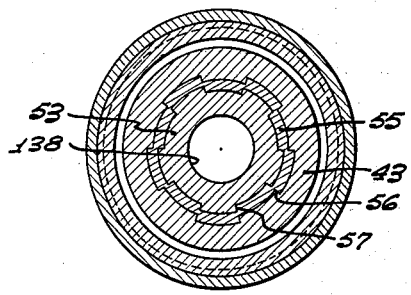
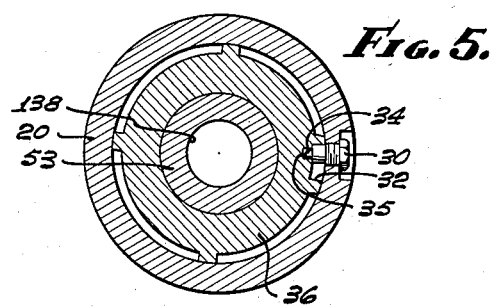
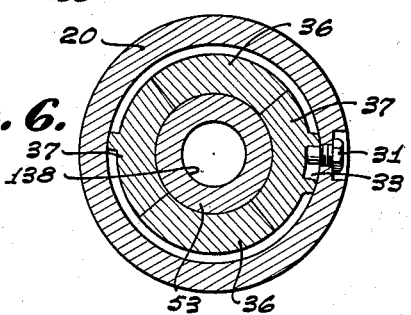
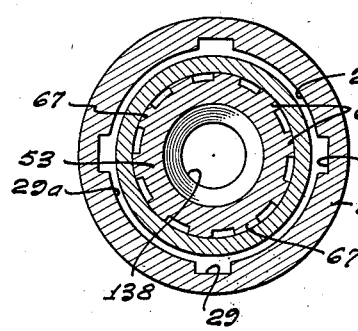
INVENTORS
ORA A. BROWN
ATTORNEY.

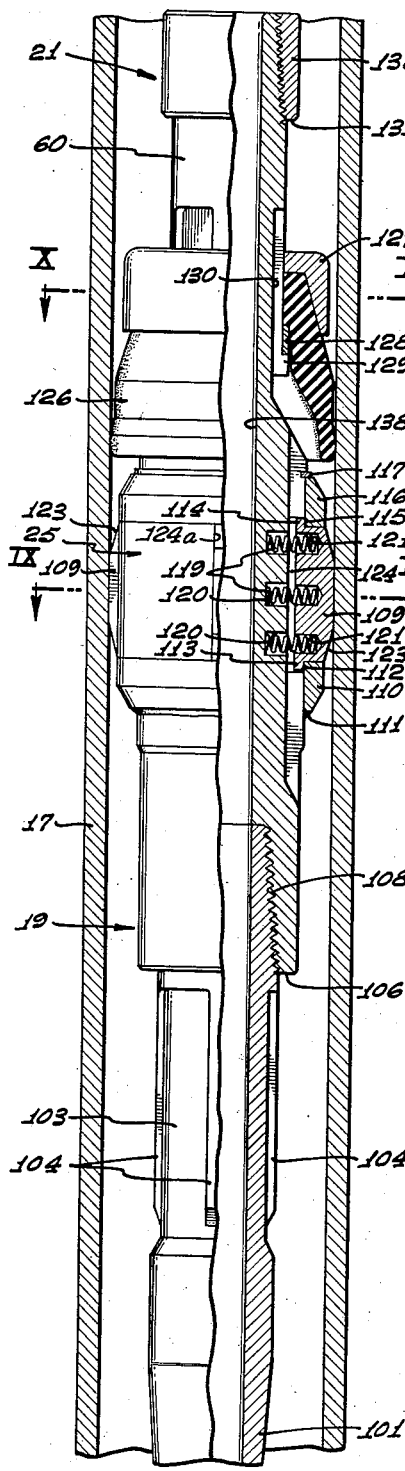
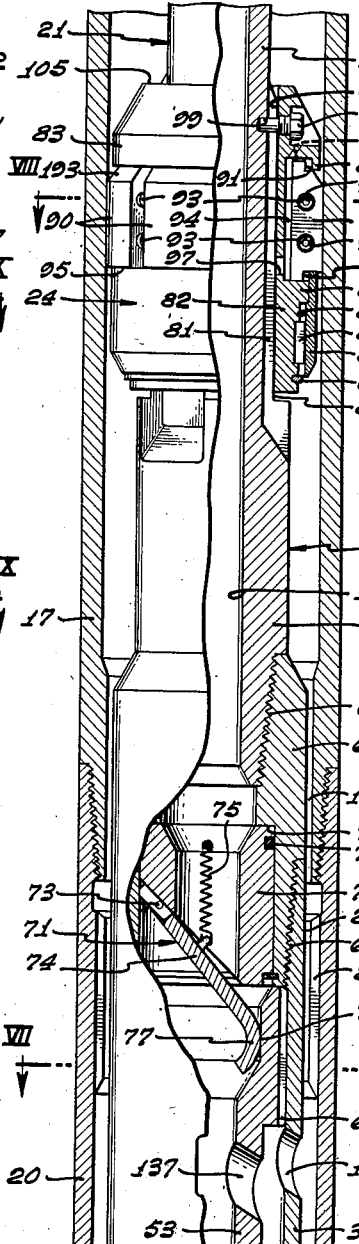
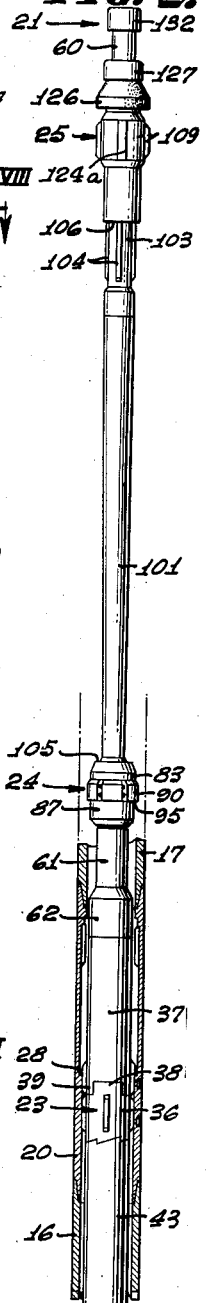

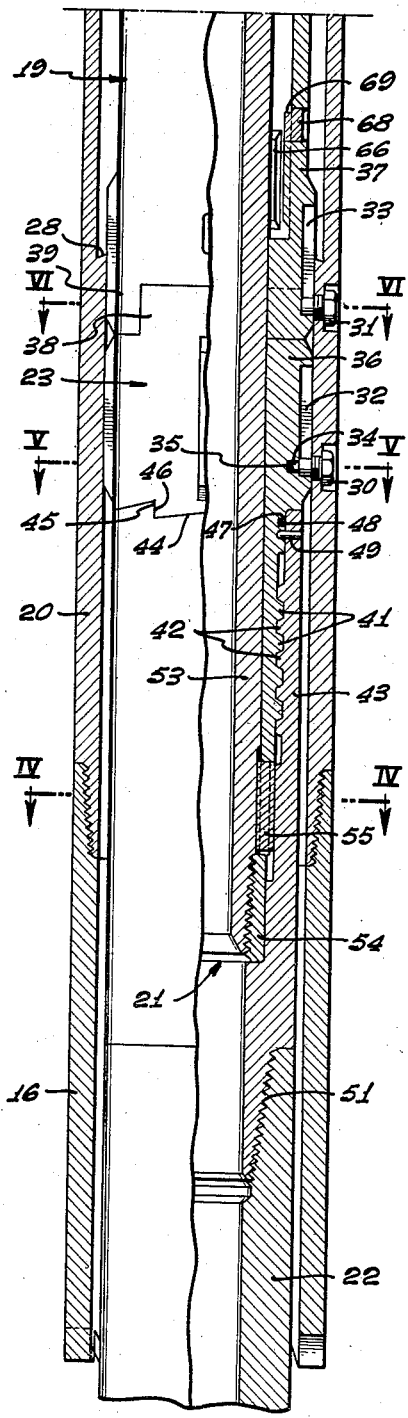
Fig. 3b.
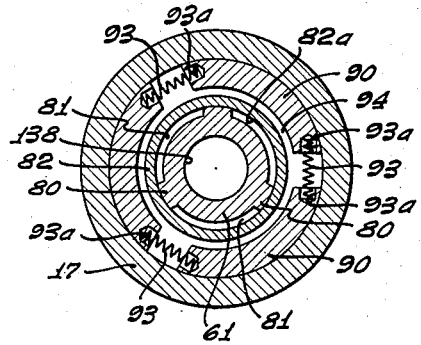
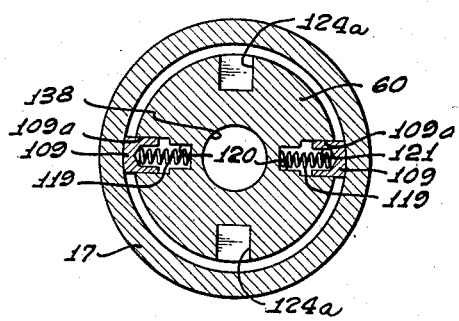
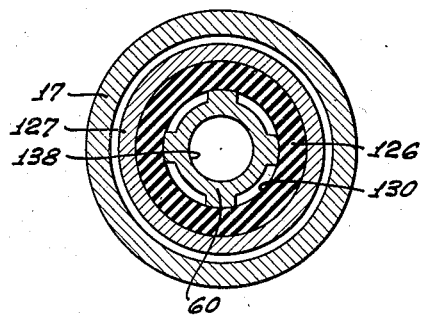

Oct. 27, 1959

O. A. BROWN 2,910,124

WELL TOOL RETRIEVING MEANS

Filed Dec. 23, 1954

INVENTORS
ORA A. BROWN

ATTORNEY.

Oct. 27, 1959  O. A. BROWN  2,910,124
WELL TOOL RETRIEVING MEANS
Filed Dec. 23, 1954  5 Sheets-Sheet 5

INVENTORS
ORA A. BROWN
ATTORNEY.

United States Patent Office 2,910,124
Patented Oct. 27, 1959

2,910,124

WELL TOOL RETRIEVING MEANS

Ora A. Brown, Whittier, Calif., assignor to Boash-Ross Tool Company, Los Angeles, Calif., a corporation of California Application December 23, 1954, Serial No. 477,268

23 Claims. (Cl. 166—98)

This invention relates to a well tool means to be used during washover operations for retrieving a fish such as drilling tools and equipment lodged in a well hole or bore.

Frequently, during the drilling of an oil well, a relatively sharp offset, key seat, or dog-leg is developed in the well bore. Such offsets permit downward passage of well drilling tools, but tend to bind and prohibit removal of said drilling tools when they are lifted upwardly. In most instances, the drilling equipment is firmly wedged and lodged in the offset portion of the well bore before the operator becomes aware of this condition. Immediate efforts of the operator to dislodge such drilling equipment are usually unsuccessful.

Under such conditions, it is common practice in well drilling to unfasten that portion of the drilling string above the offset and remove it from the well. The lower portion or fish is left firmly lodged in the offset portion. A washover string of pipe having an outside diameter slightly smaller than the existing well bore and sufficient inside diameter to allow passage over the fish is run into the well bore and the formation grasping the fish is drilled and removed by washover operation. Unless some means are taken to secure the fish during the washover operation when the offset formation is removed, the fish will be free to fall to the bottom of the well bore. The fish may not only damage itself and the well bore as a result of such a fall but further fishing operations will be required.

This invention contemplates a well tool means for use during such a washover operation whereby the fish may be secured before it is dislodged by the washover operation and wherein fall of the fish is controlled so as to minimize damage to the fish and to the well bore. In addition, the well tool means of this invention does not release its grasp on the fish so that the fish may be readily withdrawn from the well bore.

It is, therefore, the primary object of this invention to disclose and provide a well tool means to be utilized within a selected portion of a washover pipe string for retrieving a fish in a well bore during a washover operation.

An object of this invention is to disclose and provide a well tool means for use with a washover pipe string and which is capable of manipulation and connection to a fish by longitudinal or rotative movement, as desired, of the washover string.

Another object of this invention is to disclose and provide a well tool means for use in a fishing operation wherein means are provided for retarding fall of the fish at the time it is dislodged from the well bore and arresting the fall of the fish in such a manner that the operating equipment will not be subjected to undue impact or strain.

A further object of this invention is to provide a well tool means as mentioned above wherein the tool means is associated with the washover pipe in such a manner that circulation of well fluid is provided for normal manipulation and operation of the washover pipe.

A still further object of this invention is to disclose such a well tool means wherein means are provided for hydraulically cushioning and retarding fall of a dislodged fish.

A still further object of this invention is to provide a well tool means as mentioned above which includes means for disengaging a major portion of the tool from the lowermost portion thereof without disturbing the means grasping a fish so as to allow removal of the washover string and upper portion of the well tool means of this invention from the well bore in the event the fish cannot be retrieved or it is desired to perform some other operation in the well bore.

The invention contemplates such a well tool means for use during a fishing operation wherein means are provided for transmitting torque through the well tool of this invention when necessary for manipulation of the means grasping the fish.

The invention contemplates a well tool means for use in a washover operation wherein valve means are provided for trapping well fluid within the tool to hydraulically retard and cushion downward movement of a dislodged fish and wherein said valve is movable to allow passage through the bore of the well tool means for auxiliary drilling equipment such as internal cutters, back-off shots and the like.

A still further object of this invention is to disclose and provide a well tool means for use with a washover string wherein a control member is connected in a washover pipe string, wherein mandrel means are carried within the washover string and control member, and wherein a plurality of means are provided for selective interconnection and operation between the mandrel means and the control member for permitting various operations required in the retrievement of a fish.

Generally speaking, the well tool means of this invention comprises a control member or sub adapted to be connected in a desired portion of a washover pipe string. A mandrel means is positioned within the washover string including a top mandrel, an intermediate mandrel having a tapered portion and a bottom mandrel longitudinally movable with respect to the intermediate mandrel. At the lower end of the mandrel means is carried a fish grasping means. The bottom mandrel is releasably interconnected to the control sub in initial position of the well tool means and during commencement of a washover operation. Catching or landing means carried by the intermediate mandrel are provided for interengagement with the control sub after dislodgement of a fish from the well bore and are arranged to arrest the fall of the fish. Torque means are provided between the control sub and the top mandrel for disconnecting the well tool means with that portion thereof connected to the fish grasping means. Means are also provided for permitting circulation of well fluid through the tool means and for prohibiting circulation therethrough when a fish is dislodged whereby the well fluid may be used to cushion the fall of the fish.

Other objects and advantages of this invention will be readily apparent from the following description of the drawings in which an exemplary embodiment of this invention is shown.

In the drawings:

Fig. 1 is a diagrammatic view of a fish lodged in an offset and a washover pipe string positioned for drilling away the offset.

Fig. 2 is a side view of the well tool means of this invention, the control sub being shown in section and the washover pipe string being only fragmentarily shown.

Figs. 3, 3a and 3b are side views partially in section of the well tool with parts thereof positioned as the tool is run into the well hole; Fig. 3b being continuous with the lower portion of Fig. 3a and the top of Fig. 3a being continuous with the lower portion of Fig. 3; Fig. 3 showing the top portion of the well tool; Fig. 3a showing the intermediate portion of the well tool and Fig. 3b showing the lower portion of the well tool.

Fig. 4 is a transverse section taken in the plane indicated by line IV—IV of Fig. 3b.

Fig. 5 is a transverse section taken in the plane indicated by line V—V of Fig. 3b.

Fig. 6 is a transverse section taken in the plane indicated by line VI—VI of Fig. 3b.

Fig. 7 is a transverse section taken in the plane indicated by line VII—VII of Fig. 3a.

Fig. 8 is a transverse section taken in the plane indicated by line VIII—VIII of Fig. 3a.

Fig. 9 is a transverse section taken in the plane indicated by line IX—IX of Fig. 3.

Fig. 10 is a transverse section taken in the plane indicated by line X—X of Fig. 3.

Figure 11:
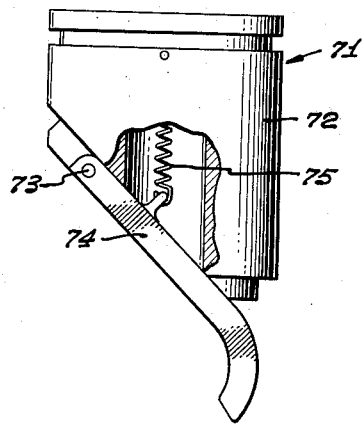

Fig. 11 is a side view partially in section of the valve assembly carried by the mandrel sub.

Figure 12:
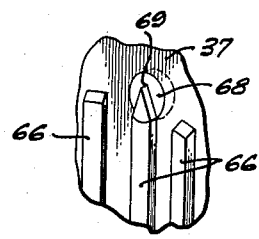

Fig. 12 is a fragmentary perspective view of the internal face of the upper clutch body portion showing guide points on internal splines thereon.

Figure 13:
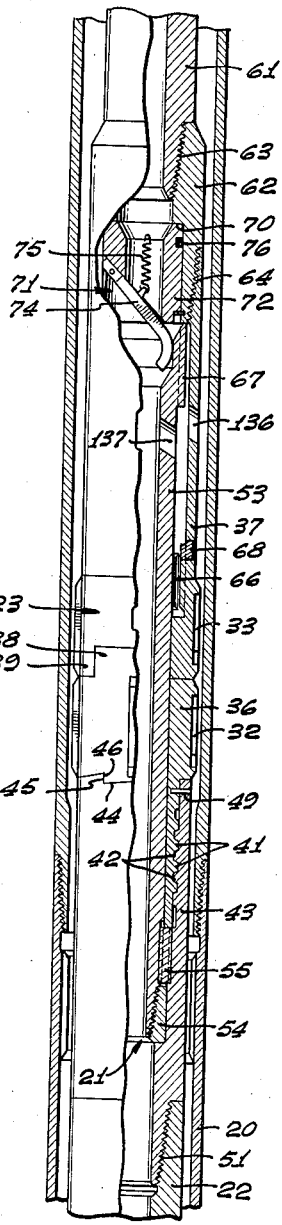

Fig. 13 is a side view partially in section of the lower portion of the well tool means within a washover pipe string during a washing over operation.

Figure 14:
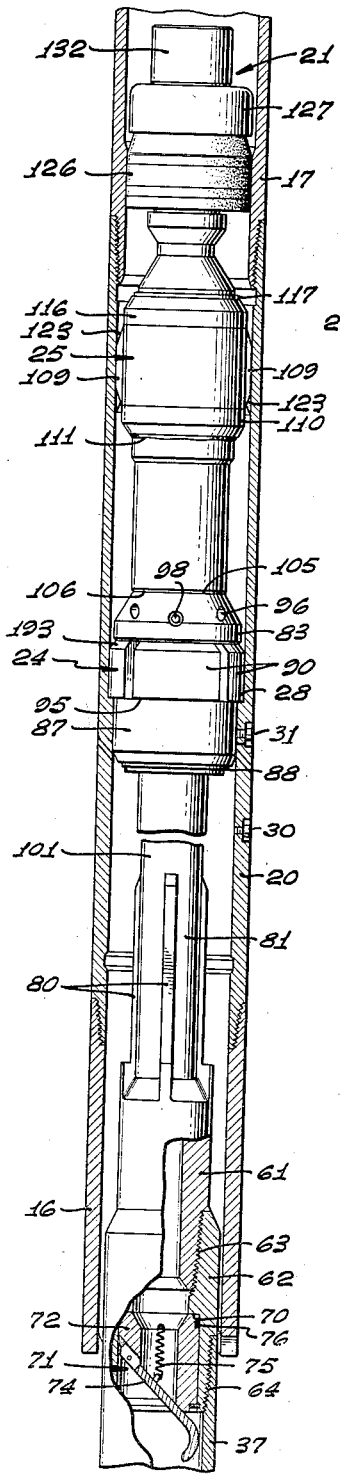
Figure 14A:
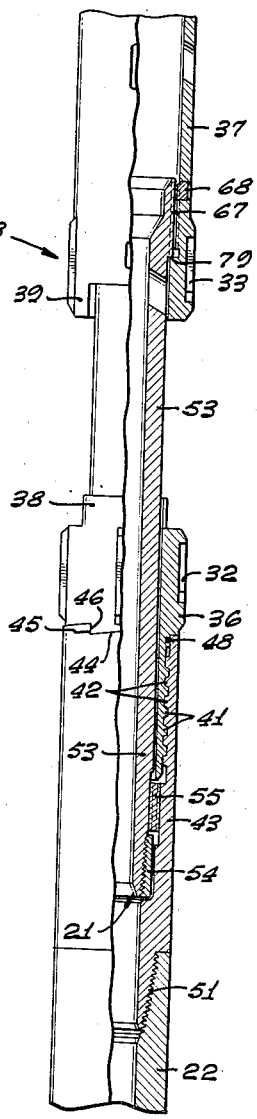

Figs. 14 and 14a are side views partly in section showing the parts of the well tool positioned for a retrieving operation; Fig. 14a being continuous with the lower portion of Fig. 14.

Figure 15:
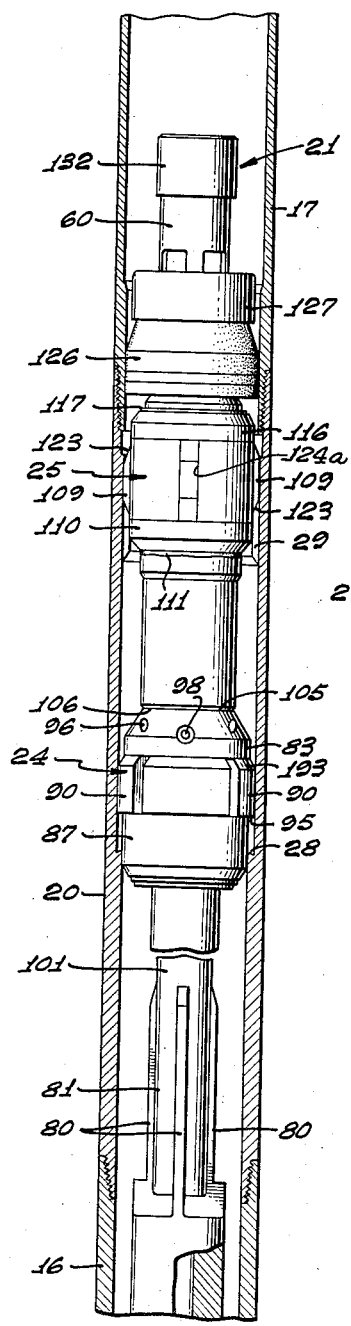
Figure 15A:
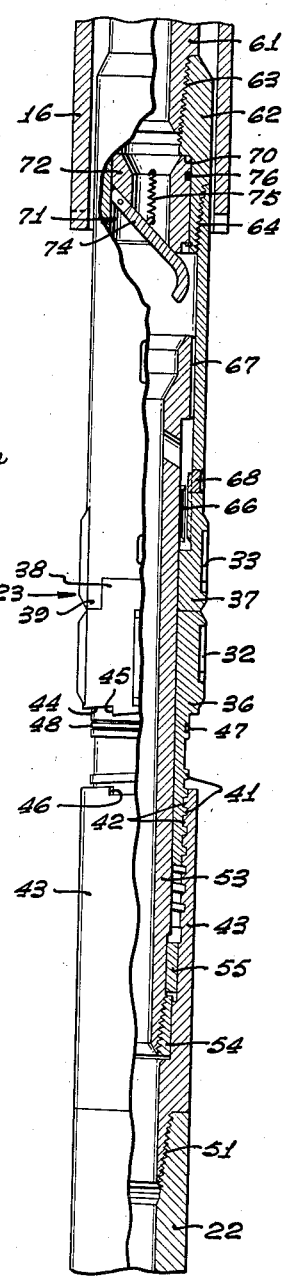

Figs. 15 and 15a are side views partly in section of the well tool of this invention of the positioning of parts of the well tool in a backoff or fish disengaging operation; Fig. 15a being continuous with the bottom of Fig. 15.

In the drawings Fig. 1 illustrates diagrammatically an offset portion or key seat in a well bore in which a part of drilling equipment has become firmly lodged by the formation surrounding the offset portion. The drilling equipment lodged in the formation may be referred to as a fish indicated generally at 15. It is understood that the fish may be any piece of drilling equipment which is desired to be removed from the well bore and may be located at the bottom of the well hole or as shown above the bottom of the hole. As illustrated, a washover shoe 16 is carried by the lower end of a washover pipe string 17 and is shown positioned just above the fish 15.

The well tool means of this invention is indicated at 19 and comprises generally a control member or sub 20 connected in a selected portion of the washover pipe 17. Within the washover pipe 17 is provided a mandrel means generally indicated at 21 capable of longitudinal and rotatable movement. The mandrel means carries at its lowermost end a fish grasping means 22. Along the length of the mandrel means is provided a plurality of means operatively interconnecting the mandrel means with the control sub for performing various operations during the retrievement of a fish. The operable means may include an initial releasable interconnecting means 23 operative when the tool is run into the hole, a landing or catcher assembly means 24 operative to control and arrest fall of the fish and a torque transmitting means 25 operative to apply torque to the mandrel means for disconnecting the tool from the fish grasping means.

The washover pipe 17 is of well-known construction and has a selected inner and outer diameter for the well bore within which it is to be used. The washover shoe 16 carried at the lowermost end of the washover pipe string may likewise be of any well-known construction.

The well tool means 19 includes the control member or sub 20 which is mounted and carried in the washover pipe string 17 at a selected portion thereof. The control sub 20 comprises an elongated tubular member having threaded connnections at each end to adjacent sections of the washover pipe. The outer diameter of the control sub is approximately the same as the outer diameter of the washover pipe. The control sub 20 is provided with an internal, upwardly facing annular shoulder 28 intermediate its ends for contact with the catcher assembly means 24 as later described. Adjacent the top of the control sub 20 may be provided a plurality of internal circumferentially spaced, longitudinally extending grooves 29 defined by inwardly extending lands 29a for interengagement with the torque transmitting means 25 as later described. It should be noted that the inner diameter of the lands 29a is not less than the minimum internal diameter of the washover pipe so that the control sub and the washover pipe may be moved longitudinally relative to the assembly of the well tool means carried within the washover pipe.

Means for initially supporting the internal assembly of the well tool means 19 within the control sub and the washover pipe for movement therewith and whereby limited longitudinal movement and limited rotative movement is provided with respect to the control sub may comprise a pair of longitudinally spaced shear pins 30 and 31 interengaged with respective longitudinally extending slots 32 and 33 of L-shape, or J-shape if desired, said slots being provided in the releasable interconnecting means 23. Each of said slots 32 and 33 may have a lateral slot section and a longitudinal or vertical slot section or leg (Figs. 5 and 6). Shear pin 30 may include an extension providing an auxiliary reduced section shear portion 34 adapted to be received within a bore 35 at the lower end of slot 32 and at the end of the lateral section thereof remote from the vertical leg of slot 32.

The releasable interconnecting means 23 includes a safety joint clutch means comprising separable lower and upper clutch body portions 36 and 37 in which the slots 32 and 33 are provided and include opposed mating interlocking portions 38 and 39 for transmission of torque through the body portions in either direction.

The lower body portion 36 is provided with external enlarged non-locking square threads 41 for threaded engagement with complementary non-locking threads 42 provided on a safety joint box 43. The body portion 36 is provided with a downwardly directed annular inclined stepped face 44 defining a shoulder 45 for interlocking engagement with a mating shoulder 46 provided on a top annular inclined stepped mating edge face of the safety joint box. The mating engagement of the safety box 43 with the lower body portion provides means for transmitting torque in one direction to the safety joint box for a purpose later described. The lower body portion 36 may be provided with an annular groove 47 accommodating an annular seal ring 48 for sealing engagement with the opposed internal surface of the safety joint box. A shear pin 49 may interconnect the top portion of the safety joint box with the lower body portion 36 adjacent to the mating engagement of face 44 with the box.

At its lower end the safety joint box is threadedly connected as at 51 to the fish-grasping means 22. The fish-grasping means 22 may be any well-known type of tool suitable for grasping a fish and actuated by longitudinal or rotational movement.

Sleeved within the safety joint clutch means and within a portion of the safety joint box is the lower end of mandrel means 21 which includes a lower longitudinally movable slip mandrel 53, said lower mandrel 53 carrying at its end a bottom mandrel nut 54 received within a recess provided in the safety joint box. Between the mandrel nut 54 and the adjacent end face of the lower body portion 36 is provided a splined locking collar 55 which interlocks against relative rotation the safety joint box with the lower mandrel by interengaging splines provided respectively on the joint box and the lower mandrel as at 56 and 57 respectively.

The mandrel means 21 also includes an upper mandrel 60 and an intermediate mandrel 61 connected with lower mandrel 53 through a mandrel sub 62 having threaded engagement with the intermediate mandrel 61 and with the top portion of the upper body portion 37 of the safety joint clutch as at 63 and 64 respectively. The clutch body portions 36 and 37 are held in clutch interengagement by the auxiliary shear portion 34 and by the accommodation of shear pins 31 and 30 within the lateral section of the slots 32 and 33. As seen in Fig. 3b, this is the relative position of the lower mandrel, safety joint clutch and control sub when running the washover pipe and tool into a well bore.

In this initial running-in relationship the internal assembly of the well tool means may be limitedly, longitudinally moved after shearing portion 34 by slight rotation of the control sub so as to permit the shear pins 31 and 30 to travel longitudinally in the slots 32 and 33. Rotative movement may be transmitted to the fish-grasping means 22 by rotating the washover pipe and control sub, such rotation being transmitted through the pins 30 and 31 and through the mating safety joint clutch portions. Thus, in initial position of the well tool the fish-grasping means 22 may be manipulated through the control sub by rotation thereof or by limited longitudinal movement thereof for properly grasping a fish.

The upper body portion 37 of the safety joint clutch includes a plurality of internal splines 66 adjacent to the clutch portions 39 for interengagement with mating splines 67 provided on the top end of the lower mandrel 53 (Fig. 14a). In order to facilitate guiding of said splines 66 into said mating engagement with the splines 67, guide plugs 68 are provided at the upper ends of splines 66, each guide plug providing a pointed or tapered end 69 for each of the splines 66. In splined mating engagement the top of the lower mandrel has an annular shoulder seated on an opposed shoulder on the upper body portion as at 79 (Fig. 14a).

The mandrel sub 62 may be provided with a shouldered recess 70 for accommodating a back pressure valve assembly 71. The back pressure valve assembly (Fig. 11) includes a ported valve body 72 of truncated cylindrical form. Pivotally mounted as at 73 on the valve body may be a flap or leaf-type valve closure member 74. A spring 75 connected to the inner face of said closure member 74 and to the valve body biases member 74 toward closed position. The biased valve member 74 may allow passage through the bore of the tool for auxiliary well tool equipment, such as backoff shots, free point indicator, internal cutter, or the like and may be returned to its normal position as shown in Fig. 3a by spring 75. It will be understood that the showing of spring 75 is exemplary only and that a biasing spring serving the same purpose and function may be located externally of the valve member 74 where it would not interfere with passage of fluid or auxiliary tools through the bore. Suitable seal means 76 may be provided between the valve body and the mandrel sub. It will be noted in Fig. 3a that in initial position of the well tool means a downwardly curved end portion 77 of the valve closure member 74 is seated as at 78 on an internal surface at the top of the lower mandrel 53 for positioning the valve closure member in slightly open position to permit circulation of well fluid through the well tool means when running into the well hole.

The intermediate mandrel 61 carries the landing or catcher assembly 24 for final arresting and retarding movement of a fish after it has been dislodged from the well bore and initially retarded by cup-shaped swab 126. Adjacent to the connection of the intermediate mandrel 61 to the mandrel sub 62, a plurality of longitudinally extending ribs 80 may be provided defining passageways 81 therebetween for flow of well fluid. Sleeved over these ribs 80 (in initial position) is catcher assembly 24, said catcher assembly including a catcher body member 82 provided with a cylindrical through bore 82a and an upper tapered annular thick section 83. Spaced below the upper section 83 is a lower thickened cylindrical section 84 providing a longitudinal key seat for a key 85 which is engaged in an elongated groove 86 provided in a sleeve retainer 87. The sleeve 87 may be retained on the body member 82 by a lock ring 88.

The retainer 87 and a downwardly extending annular lip 89 extending from the thick section 83 provide securing means for a plurality of spaced cylinder segments 90, each being provided with curved outwardly directed faces 91 and 92 for rotative, slidable engagement with lip 89 and ring 87. The segments 90 are mounted for radial inward contraction into annular space 94 by a plurality of coil springs 93 extending between adjacent spaced segments and having opposite ends received within opposed, aligned bores 93a provided in side edge faces of said segments. Normally, the springs 93 cause the segments to expand radially outwardly in engagement with the lip 89 and the ring 87.

Each segment 90 is provided on its outer surface with a tapered or beveled upper edge 193. Each segment is also provided with a downwardly and outwardly inclined arcuate shoulder 95 which is adapted to engage shoulder 28 on the control sub during a fish retrieving operation as described later. The body member 82 may be provided with a plurality of well fluid circulation ports 96 and 97 leading to the through bore 82a to permit circulation of fluid as later described.

The catcher assembly 24 is held in initial assembled position adjacent the lower end of the intermediate mandrel by a pair of shear pins 98 which extend through the body member into aligned bores 99 in the intermediate mandrel. The shear pins are broken during a fish retrieving operation as later described.

The intermediate mandrel also includes a long tapered intermediate portion 101, said tapered portion having its narrowest dimension adjacent to the upper end of ribs 80 and its largest dimension adjacent to the top of the intermediate mandrel. The large dimension is slightly less than the inner diameter of the catcher body member to permit the body member to slide thereover. The purpose of the long tapered portion 101 is to coact with the bore 82a of the body member 82 so as to provide an annular opening for flow of well fluid therethrough which gradually progressively diminishes in flow area as the catcher assembly 24 moves toward the top of the intermediate mandrel during the retarding operation. This progressive restriction on the flow of fluid serves to hydraulically cushion and retard the drop of a falling fish so that undue stress and strain will not be placed upon the drilling equipment.

At the top portion of the intermediate mandrel may be provided a plurality of longitudinal grooves 103 defined by ribs 104. When the catcher body member 82 is in uppermost position on the intermediate mandrel, the grooves 103 provide for flow of fluid beneath the collar body. In said uppermost position of the catcher assembly, it will be noted that the top edge face 105 of the body member 82 is in abutment with the bottom annular edge face 106 of the top mandrel which provides a stop means for the catcher assembly and limits the downward extended position of the mandrel means.

The top mandrel 60 is threadedly connected as at 108 to the top end of the intermediate mandrel. Adjacent said threaded connection the top mandrel 60 carries a plurality of circumferentially spaced, outwardly biased, elongated torque members 109 partially recessed within longitudinal recesses 109a to provide the torque transmitting means 25. A bottom retaining ring 110 may be welded at 111 to the top mandrel, said retaining ring providing a projecting lip for engagement as at 112 with a lug 113 on each torque member 109. The other end of member 109 is provided with an upwardly projecting lug 114 which interengages as at 115 with a top retainer ring 116 secured by a lock ring 117. A plurality of radially outwardly directed coil springs 119 are seated at their inner ends in bores 120 provided in the top mandrel and at their outer ends in bores 121 provided in each torque member 109 for biasing the members outwardly. The outer face of each member 109 may be hardened in any well-known manner and may be provided with tapered end faces 123.

Beneath each torque member 109 may be provided a longitudinally extending passageway 124 providing for circulation of well fluid and to allow retraction of the torque members 109 radially inwardly. Passageways 124a (Fig. 9) may be provided in mandrel 60 to facilitate flow of fluid past the torque transmitting means 25.

Above the torque transmitting means 25 the top mandrel may carry a cup-shaped suitable restrictor means or swab 126 for sliding sealing contact with internal surfaces of the washover pipe during certain of the washover operations and particularly to initially retard a falling fish as later described. The swab 126 may be mounted between a cup-shaped metal collar 127 and a sleeve washer 128 positioned against an outwardly projecting flange 129 provided on the top mandrel. Above the flange 129 the top mandrel may be provided with a plurality of passageways 130 extending beneath the swab 126 when the swab is positioned against the flange 129 and in initial position of the well tool. The swab 126 may slide longitudinally along the top portion of the top mandrel until the collar 127 abuts against a downwardly directed edge face 131 of a top mandrel nut 132 threaded on the top end of the mandrel means. In this latter position flow of fluid into the well tool and between the mandrel means and washover pipe is prevented because the inner bore of the swab is closed by the top end of the top mandrel.

Means for circulating well fluid between the mandrel means and the washover pipe in initial position of the well tool includes the passageways 130, 124 in the top mandrel, the passageways 96 and 97 in the catcher assembly together with the passageways 81 defined by the ribs 80 adjacent the lower end of the intermediate mandrel, the annular space 135 provided between the top end of the control sub and the mandrel sub 62, the ports 136 provided in the upper body portion of the safety joint clutch means and the ports 137 provided in the top portion of the lower mandrel. It will be apparent from Figs. 4, 5, 6 and 7 and Figs. 3a and 3b that well fluid may be circulated between the wash pipe and the well tool in the annular opening provided as shown in said figures. It should also be noted that the mandrel means includes an axial through bore 138 in which flow of well fluid is controlled by the back pressure valve assembly carried in the mandrel sub 62.

Operation of the well tool means described above will be explained for conditions wherein a fish is held in an intermediate portion of the well hole and above the bottom thereof. It will be readily apparent to those skilled in the art and from the following explanation that the well tool means of this invention also has many advantages in facilitating grasping of a fish which is located at the bottom of a well hole.

When the well tool is run into a well hole, the washover pipe string may be connected with a drill pipe string which is supported by a drilling rig through a traveling block for raising and lowering of the drill pipe string in well-known manner and to which torque may be imparted by a rotary table at the drilling rig in accordance with well-known practice, the drilling rig, traveling block, rotary table not being shown because such are well-known. The control sub 20 in the washover pipe string, as shown in Fig. 2, carries and supports the mandrel means within the wash pipe through shear pins 30, 31 and portion 34 and fish-grasping means 22 may be readily manipulated through the control sub by raising, lowering or rotating the drill pipe string from the ground surface, such selective motion being transmitted to the fish-grasping means 22 as described in detail hereinafter.

In initial running-in position, the reduced section shear portion 34 holds the control sub 20 and the safety clutch means 23 in fixed relation, that is in full clutched relation and through shear portion 34 raising and lowering of the washover pipe and mandrel means with the fish-grasping means may be accomplished. Also, rotation of the drill pipe string will produce rotation of the mandrel means and the fish-grasping means, such rotation being imparted through the shear portion 34. Upon connection of the fish-grasping means to the fish to be dislodged by a washover operation, it will be understood that the lower mandrel and fish-grasping means may now be considered to be held stationary or immovable relative to the washover pipe and control sub.

In view of the fact that drill pipe strings may vary in strength and the joints of different strings and in the same string may be broken under different amounts of torque, means are provided to selectively shear pins 31 and 30 and shear pin portion 34 so that the supporting drill pipe will not become disconnected above the wash pipe during such shearing. For this purpose, shear portion 34 is made of reduced section and may be sheared by applying torque to the drill pipe and connected washover pipe. Such shearing of portion 34 will first permit relative rotative movement between the washover pipe and the clutch portions to the extent of the lateral slot section of slots 32, 33 so that shear pins 31 and 30 may be positioned at the lower ends of the vertical legs of slots 32 and 33. In such position of pins 31 and 30, limited longitudinal movement of the wash pipe relative to the bottom mandrel is permitted to the extent of the length of the vertical legs of slots 32, 33. In such relative longitudinal movement of the wash pipe, it should be noted that the top mandrel and intermediate mandrel including the portion telescoped over the bottom mandrel moves with the wash pipe because of frictional engagement therewith at the swab 126 and members 109 while the lower mandrel 53 is held against such movement by its connection to a fish. The clutch portions may thus be selectively disengaged into unclutched relation or reengaged into full clutched relation or in partially clutched relation. For example, unclutched relation is achieved by upward movement of the wash pipe so that the bottom mandrel and bottom clutch portion 30 may be considered to move downwardly relative to shear pin 30 to the extent of the length of the vertical leg of slot 32 while shear pin 31 remains in the lower end of slot 33 and then later moves to the top of slot 33. In such position, teeth 38 are out of clutched relation. The clutch portions, may be moved into full clutched relation by a downward movement of the wash pipe relative to the clutch portions so that the shear pins 30 and 31 are each at the bottom of their respective slots 32, 33. Thus, for the length of the vertical legs of the slots 32, 33 limited longitudinal movement is provided between the control sub and the bottom mandrel and torque may be transmitted by rotation of the wash pipe through pins 30 and 31 to the mandrel means for further manipulation of the fish-grasping means if required.

It may be desirable to employ additional limited longitudinal movement between the control sub and the internal mandrel assembly of the tool. To do this the shear pin 39 associated with the lower body portion 36 may be broken and the body portions separated. Shear pin 39 may be broken as by imparting through the wash pipe sufficient torque thereto when the safety joint clutch is in unclutched position so that shear pin 31 will not be broken when the excess torque strain is imposed on pin 30. It is understood that the mandrel means is stationary relative to the wash pipe during breaking of the shear pin 39. Release of this interconnection between the control sub and the lower body portion 36 allows the lower mandrel 53, fish grasping means 22, and safety joint box 43 to move downwardly until the top splines 67 on the lower mandrel interengage with the internal splines 66 on the upper body portion 37 and thus afford a torque connection for transmitting rotation to the lower mandrel and fish grasping means if desired. Longitudinal movement between the lower mandrel 53 and the control sub 20 is afforded between the top splines 67 and the lower body portion 36.

By manipulation of the washover pipe string 17 including the control sub 20, in longitudinal and rotative movement of the well tool, the fish grasping means 22 may be actuated to take firm hold of the fish. When the fish is so grasped, the shear pin 31 interconnecting the control sub and the upper body portion 37 may be broken by either rotative or longitudinal movement. Upon breaking of this last shear pin which interconnects the control sub to the safety joint clutch of the well tool, the internal mandrel assembly of the tool is free to move longitudinally within the washover pipe. If the fish grasping means has been secured to the fish without detailed limited longitudinal manipulation described above, it is understood that both shear pins 30 and 31 may be simultaneously broken so as to free the internal assembly within the washover pipe string.

It will thus be understood that shear portion 34 and shear pins 30 and 31 may be selectively broken or sheared at the same time depending upon the conditions encountered in the well hole with respect to grasping of the fish so as to provide selective limited or full longitudinal movement of the wash pipe relative to the mandrel means without losing control of the mandrel means with respect to the capability of applying torque thereto. Depending upon well hole conditions and the condition of the drill pipe string, torque may be imparted to the mandrel means without breaking a joint in the drill string, and if it is undesirable to shear pins 30, 31 by torque, they may be sheared by longitudinal movement of the wash pipe relative to the mandrel means. Thus the detailed shearing arrangement described above permits universal usage of the washover tool of this invention in various drill pipe strings. In this condition of the well tool the washover pipe string may be moved downwardly without limitation as between the washover pipe, control sub and internal mandrel means in a washover process for drilling the formation holding the fish. Such downward movement of the washover pipe string to a lower position is shown in Fig. 13. It will be noted that the top portion of control member 20 is located opposite the safety joint and the portion of the pipe string above the control member is opposite the bottom mandrel 53. Thus the washover operation may be continued by downward movement of the washover pipe string relative to the mandrel means and to the fish grasping tool until the fish is freed from its lodged position, if such further downward movement is necessary. It will be noted that valve 74 still engages internal shoulder 78 on the upper portion of the lower mandrel 53 so that fluid may circulate through the ported valve member 72. The swab 126 slides along the internal surface of the washover string and is spaced from the top mandrel nut to allow circulation of fluid. Ultimate upward movement of the washover pipe string relative to the internal mandrel assembly is limited by the control sub which affords the internal shoulder 28 which engages the shoulders 95 on the catcher assembly.

After the washover operation has dislodged the fish, the internal mandrel assembly, the fish grasping means and the fish will fall downwardly in the well hole. When downward movement of the internal mandrel assembly begins, the swab 126 carried by the top mandrel 60, because of its downwardly and outwardly directed swabbing flange, is caused to move upwardly relative to the top mandrel by pressure of well fluid, to seat against the top mandrel nut, and to thus close, at the top, the circulation passageways between the mandrel means and the washover pipe string. Also, at that time, the back pressure valve is closed because the lower mandrel 53 was positioned downwardly relative to the upper body portion 37 and thus the valve closure flap 74 is no longer supported in partially open position by the internal surface of the lower mandrel. Circulation of fluid is thus prevented through the through bore of the mandrel means and between the swab 126, the washover pipe, and the top mandrel. As a result of this condition, a pressure differential is created in the fluid on opposite sides of the swab 126. This pressure differential acts to retard fall of the internal mandrel assembly. The retarded fall is finally stopped by the following sequence of events.

When the internal mandrel assembly has fallen into the portion of the washover pipe string containing the control sub, abutment of the internal shoulder on the control sub with the opposed shoulder on the catcher assembly under such falling conditions will cause shear pins 98 interconnecting the catcher assembly with the lower end of the intermediate mandrel to be sheared. The mandrel means, fish grasping means, and fish continue their downward fall. This downward movement is further retarded, however, by the action of well fluid trapped between the back pressure valve 71 which is now closed and the cooperable sealing relationship of the top mandrel nut and swab 126.

As the mandrel means moves downwardly through the catcher assembly (now held by the control sub) the annular opening for well fluid between internal bore 82a of the catcher body member and the progressively increased tapered portion of the intermediate mandrel gradually restricts flow of fluid therebetween and thus hydraulically retards and cushions the fall of the mandrel means and fish. When the catcher assembly almost reaches the top of the intermediate mandrel, the large end of the tapered portion of the intermediate mandrel substantially closes the internal bore of the catcher body member so that downward movement is substantially stopped by trapped fluid between the catcher assembly and the swab. As the catcher assembly passes over the large end of the tapered portion, the top edge thereof abuts the stop means (face 106) on the bottom of the top mandrel. At the same time the internal lands 29a on the control sub engage and may compress the retractable torque members 109 of the torque transmitting means 25 carried by the top mandrel. Interengagement of the grooves 29 on the control sub with the torque members 109 may be effected by rotation of the washover string pipe and a torque transmitting connection is thus again afforded between the control sub in washover pipe string and the mandrel means.

It will thus be noted that the fall of the fish has been brought to a relatively gentle stop and that control of the fish is still retained because of the torque connection with the control sub. In this condition, the fish may be readily removed from the well hole by lifting the washover pipe string.

It will be understood that in the event the fish was at the bottom of the well, the fish could be withdrawn from the well after it had been grasped by the fish grasping means and a washover operation completed. During withdrawal of the fish from the well, the shear pins 30 and 31 are broken. In such operation, the catcher assembly and swab would not be operative and in the makeup of the tool may be omitted if desired.

In the event it is desired to leave the fish in the well hole in order to conduct some other well operation with respect thereto, the well tool means of this invention may be readily separated from the safety joint box 43 so that only the safety joint box and the fish-grasping means 22 remain in the well hole.

To accomplish this release operation, it will be understood that the fish may be resting on the bottom of the hole or tightly held in the well bore, and that the relative positions of the internal mandrel assembly of the tool and washover pipe and control sub are substantially as shown in Figs. 14 and 14a wherein the lower mandrel 53 is extended and is in splined engagement with the upper body portion 37 of the clutch. With the fish held against further movement, the washover pipe may be lowered so that the upper body portion 37 is moved downwardly into clutched engagement with the lower body portion 36. Upon such downward movement the internal mandrel assembly will likewise move downwardly with the washover pipe and control sub because of frictional engagement of swab 126 and the outwardly biased torque members 109 with the internal surfaces of the washover pipe. It should also be noted that the pressure of drilling fluid in the washover pipe above the tool will exert a substantial force upon the well tool. When clutched engagement has been made, further downward movement of the washover pipe string and control sub will cause the swab 126 to move downwardly with respect to the top mandrel into abutting engagement with the sleeve ring 128 and open passageways 130 for circulation of fluid. This downward movement of the washover pipe and control sub disengages the intersplined connection between the upper body portion 37 of the clutch and the top end of the lower mandrel 53 and disengages shoulders 28 and 95. As a result, when torque is transmitted through the control sub to the top mandrel, the clutched engagement of the safety joint clutch will allow rotation of the lower body portion 36 with respect to the safety joint box 43 so as to commence unthreading of the lower body portion of the clutch with the safety joint box. It should be noted that the torque connection between the control sub 20 and the torque-transmitting means 25 is maintained during limited relative longitudinal movement during the unthreading operation. It may be necessary to again raise for a short distance the washover string so as to prevent the splines on the top of the lower mandrel 53 from entering into engagement with the splines on the upper body portion 37 of the safety joint clutch. When the safety joint box 43 has been completely unthreaded from the lower body portion 36 lifting of the washover string will cause splined engagement between the lower mandrel 53 and the upper body portion 37 and abutting engagement, as at 79. Further pulling upward on the washover string will cause the lower mandrel nut 54 to bear against the locking collar 55 to disengage the collar with the safety joint box. The lower body portion is prevented from slipping over the lower mandrel by abutment with the locking collar.

It will be apparent that during this back off and release operation, circulation of fluid is provided through the well tool. Circulation is provided through the several passageways afforded between the mandrel assembly and the several means for interconnecting the assembly with the control sub.

The above explanation of the operation of this tool describes three major functions or accomplishments of the tool. It will be understood that it may be readily operated in other various conditions which arise in a well hole.

It will thus be readily apparent that the well tool means of this invention provides numerous advantages in retrieving a fish. While the well tool means has been described and explained with respect to a fish which has been lodged in an offset portion of a bore, it will be readily understood that the well tool means may be used to recover a fish which is resting at the bottom of a well hole. In such a situation, the fish grasping means may be readily manipulated in longitudinal movement and rotative movement as described above.

It will thus be readily apparent to those skilled in the art that the well tool means of this invention is capable of being operatively employed in a washover string, permits circulation of well fluid during a washover operation, permits longitudinal and rotative manipulation of the fish grasping means so as to secure the fish, permits the fish to fall without losing the fish, provides means for retarding and finally arresting the fall of the fish without undue stress on the well equipment, permits ready withdrawal of the fish from the well hole, and provides a means for disconnecting and reconnecting the well tool means from the initial fish grasping means so that other well operations may be performed in the interim.

It is understood that numerous modifications and changes may be made in the well tool means of this invention which come within the spirit of this invention and all such modifications and changes are embraced by the appended claims.

I claim:

1. A well tool for facilitating fishing operations in a well hole, comprising, in combination: a washover pipe string; a tubular control member connected in said pipe string and including an internal shoulder and internal longitudinal grooves; a mandrel means longitudinally movable in said control member and pipe string, said mandrel means being adapted to carry a fish grasping tool at its lower end; means interconnecting said control member and said mandrel means to support said mandrel means in initial position, said interconnecting means being releasable after said fish is grasped for relative longitudinal movement of the mandrel means within the pipe string and control member; means carried by the mandrel means operative upon freeing of the fish by the washover operation to limit falling of the fish, said operative means comprising a ported landing assembly initially held against longitudinal movement relative to the mandrel means and movable along said mandrel means above said interconnecting means, said mandrel means extending through said ported landing assembly, said landing assembly being provided with a face for abutment with said shoulder on said control member, said mandrel means being downwardly movable with respect to said landing assembly upon release of said landing assembly therefrom; stop means carried at the top of the mandrel means engageable with said landing assembly to limit longitudinal movement of the mandrel means and to position the mandrel means in extended position; and means on the top of the mandrel means engageable with said grooves on the control member when the mandrel means is in downwardly extended position to transmit torque to the mandrel means for release of a fish grasped by the fish grasping tool.

2. A well tool for facilitating fishing operations in a well hole, comprising, in combination: a washover pipe string; a tubular control member connected in said pipe string and including an internal shoulder and internal longitudinal grooves; a mandrel means adapted to be longitudinally movable in said control member and said pipe string and adapted to carry a fish grasping tool at its lower end, said mandrel means having a valved through bore; passageway means for well fluid btween said mandrel means and said pipe string and control member; a closure means carried at the top of said mandrel means adapted to close said passageway means; means interconnecting said control member and said mandrel means to support said mandrel means in initial position, said interconnecting means being releasable after said fish is grasped for relative longitudinal movement of the mandrel means within the pipe string and control member; means carried by the mandrel means operative upon freeing of a fish to retard downward movement of the mandrel means, said operative means comprising a ported landing assembly movable along said mandrel means above said interconnecting means, said landing assembly being provided with a face for abutment with said shoulder on said control member during downward movement of the mandrel means and for effecting movement of said landing assembly along said mandrel means, said closure means and said valved through bore in closed position being operative with said ported landing assembly during such downward movement of said mandrel means to entrap well fluid and to restrict flow of well fluid from one side of said landing assembly to the other side thereof for cushioning downward movement of the mandrel means; stop means on the top of the mandrel means engaged by said landing assembly to limit longitudinal movement of the mandrel means; and means on the top of the mandrel means engageable with said grooves on the control member when the mandrel means is in downward extended position to transmit torque thereto for release of a fish grasped by the fish grasping tool.

3. A well tool as stated in claim 2 wherein said closure means at the top of said mandrel means is movable relative to the mandrel means to open said passageway means for further circulation of well fluid when the mandrel is in downward extended position.

4. A well tool for facilitating fishing operations in a well hole, comprising, in combination: a tubular pipe string including an internal shoulder and internal longitudinal grooves spaced from said shoulder; a mandrel means longitudinally movable in said pipe string; means interconnecting said pipe string and said mandrel means to support said mandrel means therein in initial position, said interconnecting means being releasable for relative longitudinal movement of the mandrel means and of the pipe string; a landing assembly co-acting with the mandrel means and provided with a face for abutting engagement with said shoulder on said pipe string whereupon said landing assembly is movable along said mandrel means as said mandrel means continues downward movement; stop means on the mandrel means engageable with said landing assembly to limit longitudinal movement of the mandrel means with respect to the pipe string; and means on the top of the mandrel means engageable with said grooves on the pipe string for transmitting torque to the mandrel means.

5. A well tool for facilitating fishing operations in a well hole comprising, in combination: a tubular pipe string including an internal shoulder; a mandrel means longitudinally movable in said pipe string; means interconnecting said pipe string and said mandrel means to support said mandrel means therein in initial position, said interconnecting means being releasable for relative longitudinal movement of the mandrel means and of the pipe string; a landing assembly co-acting with the mandrel means and provided with a face for abutting engagement with said shoulder on said pipe string whereupon said landing assembly is movable along said mandrel means as said mandrel means continues downward movement; and stop means on the mandrel means engageable with said landing assembly to limit longitudinal movement of the mandrel means with respect to the pipe string.

6. In combination with a pipe string and a mandrel means carried within said pipe string for relative longitudinal movement therewith and adapted to extend therebeyond for connection to a fish, the provision of: means interconnecting said mandrel means to said pipe string and including a bottom mandrel having a bottom clutch portion and an adjacent mandrel having a top clutch portion interengageable with the bottom clutch portion of the bottom mandrel; independent means releasably connecting the bottom clutch portion to the pipe string and the top clutch portion to the pipe string, said bottom mandrel being movable relative to the adjacent mandrel upon release of the interconnecting means between the bottom clutch portion and the pipe string to provide limited longitudinal movement of the bottom mandrel with respect to the adjacent mandrel whereby said clutch portions are disengaged; and means carried by the bottom mandrel and means carried by the adjacent mandrel interengageable in extended position of the bottom mandrel to transmit torque from the pipe string to the bottom mandrel.

7. The combination claimed in claim 6 including safety joint means below and carried by said bottom clutch portion for connecting a fish engaging tool to said bottom mandrel.

8. A well tool for use in a washover operation, comprising, in combination: a washover pipe string including a control member therein having an internal shoulder and internal grooves spaced from said shoulder; mandrel means adapted for longitudinal movement within said pipe string and movable to a downward extended position relative to said pipe string, said pipe string being also movable downwardly relative to said mandrel means for continuing a washover operation, said mandrel means including interconnected top mandrel, intermediate mandrel and a bottom mandrel; releasable means interconnecting said bottom mandrel to said control member below said shoulder to support said mandrel means in initial position, said pipe string upon release of said releasable interconnecting means being movable downwardly with respect to said mandrel means for a washover operation; a landing assembly movably associated with the intermediate mandrel and provided with a face for abutting engagement with said shoulder upon downward movement of the mandrel means towards said downward extended position; a torque-transmitting means carried by said top mandrel and engageable with said grooves in said control member when said mandrel means is in downward extended position; and stop means carried by said top mandrel cooperable with said landing assembly to limit downward movement of said mandrel means within said pipe string.

9. A well tool as stated in claim 8 including means releasably connecting said bottom mandrel to a fish engaging tool which extends below said washover pipe string in initial position of said mandrel means.

10. A well tool as stated in claim 8 wherein said releasable connection of said bottom mandrel to said control member includes a bottom clutch carried by said bottom mandrel and a shear pin connecting said bottom clutch to said control member, and a top clutch portion carried by said intermediate mandrel and a shear pin connecting said top clutch to said control member.

11. A well tool as stated in claim 8 wherein said bottom mandrel includes a top portion, said intermediate mandrel having a clutch portion carried thereby receiving said top portion in telescopic relation, and internal spline means on said clutch portion and external spline means on the top portion of said bottom mandrel interengageable therewith for transmitting torque when said bottom mandrel is extended in relation to said intermediate mandrel.

12. A well tool as stated in claim 8 wherein said landing assembly includes a plurality of outwardly biased cylindrical segments for engagement with internal surfaces of said pipe string, and means on said landing assembly for mounting said cylindrical segments for rotation of said intermediate mandrel relative thereto.

13. A well tool as stated in claim 8 wherein said intermediate mandrel includes an elongated tapered portion extending between said landing assembly and said top mandrel, said landing assembly being provided with an annular opening for said tapered portion and cooperable therewith upon release of said landing assembly from said intermediate mandrel for progressively decreasing flow area between said opening and said tapered portion for dampening downward movement of said mandrel means.

14. In a well tool for facilitating a fishing operation in a well hole, the combination of: a tubular washover pipe string provided with an internal shoulder; an elongated mandrel means provided with a through bore, said mandrel means being longitudinally movable in said pipe string; a valve means for said through bore; passageway means for well fluid between said pipe string and said mandrel means; closure means carried by said mandrel means for closing said passageway means; and a landing assembly movable along the mandrel means intermediate ends of the mandrel, said landing assembly having a face engageable with said shoulder on the pipe string for effecting movement of said landing assembly along the mandrel means, said landing assembly having an axial opening therein, said mandrel means being provided with an elongated tapered portion movable through said axial opening of the landing assembly, said closure means and said valve means being in closed position upon downward movement of the mandrel means relative to the pipe string after said landing assembly is released from said mandrel means whereby well fluid is entrapped below said closure means and whereby said axial opening in the landing assembly and said tapered portion of the mandrel means cooperate to progressively retard flow of fluid past said landing assembly for hydraulically cushioning downward movement of the mandrel means.

15. In combination with a pipe string and a mandrel means carried within said pipe string for relative longitudinal movement therewith, and adapted to extend therebeyond for connection to a fish, the provision of: means interconnecting said mandrel means to said pipe string said mandrel means including at least a lower mandrel portion having a clutch portion and an adjacent mandrel portion having a clutch portion interengageable with the clutch portion of the lower mandrel portion; independent means releasably connecting the clutch portions of both mandrel portions to the pipe string, said lower mandrel portion being longitudinally movable relative to the adjacent mandrel portion upon release of the interconnecting means between the clutch portion of the lower mandrel portion and the pipe string to provide limited longitudinal movement of the lower mandrel portion with respect to the adjacent mandrel portion whereby said clutch portions are disengaged; and means carried by the lower mandrel portion and means carried by the clutch portion of the adjacent mandrel portion interengageable in extended position of the lower mandrel portion to transmit torque from the pipe string to the lower mandrel portion; safety joint means carried by the clutch portion on lower mandrel portion for connecting a fish engaging tool thereto, said lower mandrel portion being positionable in an intermediate position relative to said clutch portion on the adjacent mandrel portion whereby said lower mandrel portion and said adjacent mandrel portion are out of torque transmitting relation and said clutch portions of said mandrel portions are interengaged for transmitting torque therebetween for unthreading said safety joint means.

16. A well tool for facilitating fishing operations in a well hole, comprising, in combination: a washover pipe string; a tubular control member connected in said pipe string and including an internal shoulder and internal longitudinal grooves; a mandrel means longitudinally movable in said control member and pipe string, said mandrel means being adapted to carry a fish grasping tool at its lower end; means interconnecting said control member and said mandrel means to support said mandrel means in initial position, said interconnecting means being releasable after said fish is grasped for relative longitudinal movement of the mandrel means within the pipe string and control member; means carried by the mandrel means operative upon freeing of the fish by the washover operation to limit falling of the fish, said operative means comprising a ported landing assembly initially held against longitudinal movement relative to the mandrel means and movable along said mandrel means above said interconnecting means, said landing assembly being provided with a face for abutment with said shoulder on said control member, said mandrel means being downwardly movable with respect to said landing assembly upon release of said landing assembly therefrom; stop means carried at the top of the mandrel means engageable with said landing assembly to limit longitudinal movement of the mandrel means and to position the mandrel means in extended position; and means at the top of the mandrel means engageable with said grooves on the control member when the mandrel means is in downwardly extended position to transmit torque to the mandrel means for release of a fish grasped by the fish grasping tool; said mandrel means including an elongated tapered intermediate portion movable through said ported landing assembly upon release of said landing assembly from said mandrel means whereby said tapered portion and said ported landing assembly provides an annular opening progressively decreasing in flow area as said mandrel means moves downwardly for progressively restricting flow of fluid therethrough.

17. In combination with a well tool including a washover pipe having an internal shoulder; a mandrel means provided with a through bore and longitudinally movable in said pipe; a valve means for said through bore; passageway means for well fluid between said pipe and said mandrel means; and closure means carried by said mandrel means and engageable with said pipe and movable on the mandrel means into a position for closing said passageway means: a landing assembly having an opening therein for receiving therethrough said mandrel means, said landing assembly having a face engageable with said shoulder on said pipe for movement of the mandrel means relative to the landing assembly in one direction, said closure means and said valve means being in closed position upon such movement in said direction for entrapping well fluid below said closure means, said mandrel means being provided with a section of metal increasing in area in the direction opposite to said one direction and defining with said opening of said landing assembly a varying flow area for passage of fluid from one side of the landing assembly to the other side thereof and operable to progressively retard movement of the mandrel means relative to said landing assembly and pipe.

18. A well tool for facilitating fishing operations in a well hole, comprising in combination: a tubular pipe string including an internal shoulder; a mandrel means longitudinally movable in said pipe string; a landing assembly provided with a face for abutting engagement with said shoulder on said pipe string whereupon said landing assembly is movable along said mandrel means upon downward movement of said mandrel means with respect to said pipe string; means on said landing assembly and means on said mandrel means cooperable therewith during such movement to progressively retard downward movement of said mandrel means; and stop means on the mandrel means engageable with said landing assembly to limit longitudinal movement of the mandrel means with respect to the pipe string.

19. A well tool as stated in claim 18 wherein said means on said mandrel means which is cooperable with said means on the landing assembly includes progressively upwardly increasing cross-section of metal for defining with said means on said landing assembly a progressively variable opening for flow of fluid through said landing assembly.

20. In combination with a washover pipe having internal engagement means thereon: a mandrel means comprising a plurality of interconnected mandrel portions including upper and lower spaced mandrel portions cooperable with said washover pipe; and an intermediate mandrel portion provided with a progressively increasingly varying metal section in the direction of the upper mandrel portion; and a landing assembly carried by said intermediate mandrel portion and having engagement means cooperable with the engagement means on said pipe and having an opening coacting with said longitudinally varying section of the intermediate mandrel for varying flow area therebetween whereby fluid surrounding said intermediate mandrel portion and passing through said variable opening serves to dampen relative movement between said mandrel means and said pipe string.

21. A mandrel means as stated in claim 20 wherein said lower mandrel portion includes means thereon cooperable with means supported by said intermediate mandrel portion for transmitting torque therebetween in a selected longitudinal position with respect to said intermediate mandrel.

22. In combination with a pipe string: a mandrel means including adjacent mandrel portions, each being provided with clutch portions interengageable in one position of the mandrel portions, means on said pipe string and means on said mandrel means for transmitting torque from said pipe string to said mandrel means, said mandrel portions in clutch-engaged position being adapted to transmit torque from said pipe string through said clutch portions to one of said mandrel portions, said mandrel portions being extendable into spaced relation upon disengagement of said clutch portions, said one mandrel portion in such extended position having means in engagement with means on the clutch portion supported by the other mandrel portion for transmission of torque from said other mandrel portion.

23. In a well tool for use in a washover operation, the combination of: a washover pipe string; a control member connected in said washover pipe string; a mandrel means longitudinally movable within said control member and pipe string and provided with a through bore having an open top end; engagement means on said control member and engagement means carried by said mandrel means cooperable therewith for limiting longitudinal movement of the mandrel means relative to said control member; a valve means in said through bore spaced from the lower end thereof; said mandrel means and said washover pipe string and control member providing a passageway means therebetween for circulation of well fluid; and closure means for a portion of said passageway means adjacent the top of said mandrel means, said closure means having slidable sealing engagement with said washover pipe string, means adjacent the top of said mandrel means defining with said closure means said passageway portion, said closure means being movable relative to the mandrel means and in one position of the closure means closing said passageway portion and in another position opening said passageway portion whereby well fluid may be trapped below said closure means when said valve means and said closure means are in closed position.

References Cited in the file of this patent

UNITED STATES PATENTS

| | | |
|---|---|---|
| 1,529,409 | Condra | Mar. 10, 1925 |
| 1,747,020 | Church et al. | Feb. 11, 1930 |
| 1,871,319 | Griswald et al. | Aug. 9, 1932 |
| 2,449,841 | Claypool et al. | Sept. 21, 1948 |
| 2,577,605 | Clayton | Dec. 4, 1951 |
| 2,647,008 | Stewart et al. | July 28, 1953 |
| 2,762,438 | Naylor | Sept. 11, 1956 |